W. L. WATERS.
ELECTRICALLY HEATED VESSEL.
APPLICATION FILED APR. 12, 1913.
1,183,924.
Patented May 23, 1916.
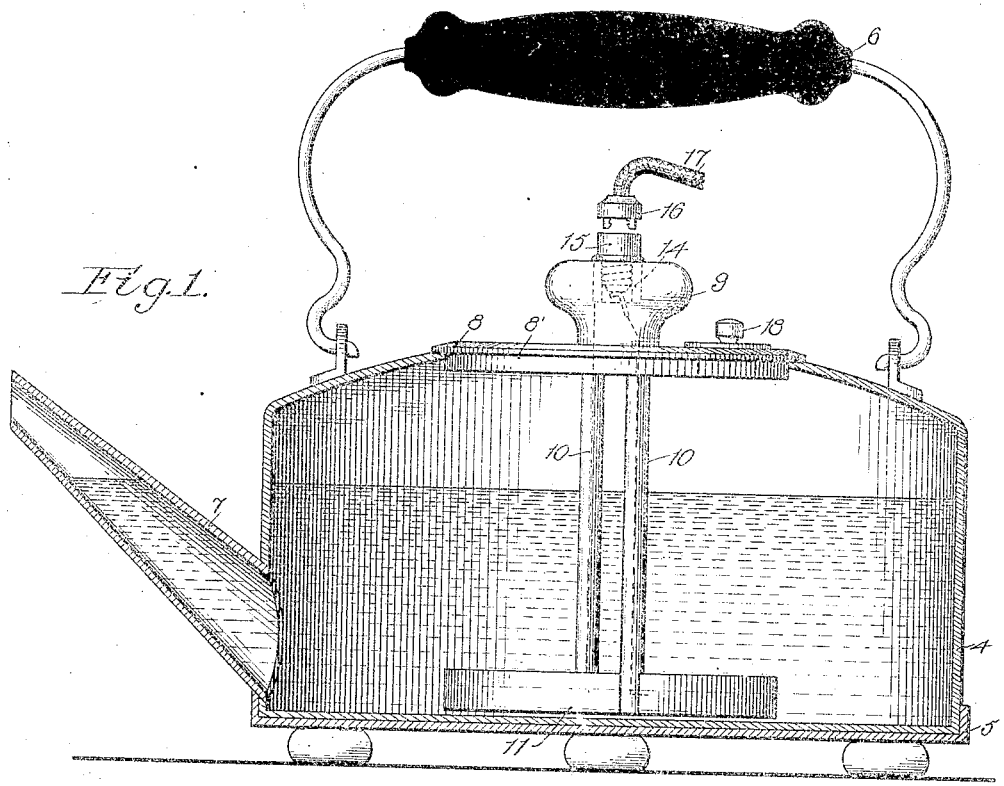
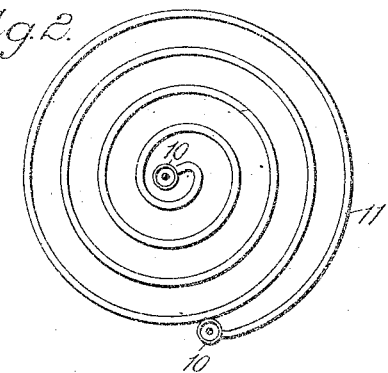
Witnesses:
Robert F. Bracke
A. L. McCabb
Inventor
William L. Waters
By Brown, Williams, Bell, Hanson & Bottcher
Attorneys

UNITED STATES PATENT OFFICE.

WILLIAM L. WATERS, OF MILWAUKEE, WISCONSIN.

ELECTRICALLY-HEATED VESSEL.

1,183,924.  Specification of Letters Patent.  Patented May 23, 1916.

Application filed April 12, 1913. Serial No. 760,668.

*To all whom it may concern:*

Be it known that I, WILLIAM L. WATERS, a citizen of the United States, residing at Milwaukee, in the county of Milwaukee and State of Wisconsin, (whose post-office address is University Club, Milwaukee, Wisconsin,) have invented certain new and useful Improvements in Electrically-Heated Vessels, of which the following is a full, clear, concise, and exact description, reference being had to the accompanying drawings, forming a part of this specification.

My invention relates to electrically heated vessels, and its object is to provide a heater supported from the lid or cover of the vessel and spaced therefrom, the said heater being removable from the vessel with the said lid or cover.

The heater is preferably in the form of a spiral, although not necessarily so, in order to obtain a sufficient external surface for communicating heat to the contents of the vessel. The heater in the form of my invention herein illustrated is secured to and spaced from the cover of the vessel by means of a pair of hollow tubes which also serve as conduits for the wires by means of which electric energy is furnished to the heater.

An important feature of the electric heater of my invention, is that it can be readily attached to the lid or cover usually supplied with a commercial heating vessel. The wires, which are electrically connected with the high resistance winding of the heater preferably terminate in a socket in the handle attached to the vessel cover.

These and other features of my invention are set forth in the following description and are illustrated in the accompanying drawing in which—

Figure 1 is a cross-sectional view of an electrically heated vessel embodying my invention. Fig. 2 is a plan view of the heater and the tubes connecting it with the lid or cover of the vessel, and Fig. 3 is a cross-sectional view of one of the turns of the spiral heater.

Similar reference numerals refer to similar parts throughout several views.

In the drawings I have shown a vessel at 4, which vessel may, if desired, be provided with an auxiliary bottom (5), and a suitable handle (6) as illustrated. A suitable spout (7) is soldered or secured in position in any other suitable manner. The vessel (4) is provided with the usual opening (8') in the top thereof. This opening is closed by means of a standard lid or cover (8) provided with a handle (9) as illustrated. Secured to the cover (8) is a pair of tubes (10) preferably of copper, which support at their lower ends a heater (11). The heater (11) may consist of a flattened copper tube of spiral conformation within which is disposed a strip of mica indicated at 12, upon which is wound a resistance conductor (13) as shown. I do not, however, limit myself to a heater of spiral conformation because a heater in the form of a disk or other suitable form may be employed, if desired. The tubes (10), besides supporting the heater, serve as conduits for conductors, each electrically connected with the high resistance conductor (13) and terminating in a socket (14) in the handle (9).

It should be noted that the parts are so proportioned and conformed that the heater (11) lies in very close proximity to the bottom of the vessel when the cover (8) is in position. Owing to the comparatively small height of the heater, it is entirely immersed when there is very little liquid in the vessel.

The heater (11) may, if desired, be readily attached to the cover usually supplied with any commercial heating vessel by merely soldering or otherwise securing the spacing tubes (10) in position, the heater being carried by said tubes. Owing to the simple method of securing the heater in position, it may be readily renewed if this should become necessary or desirable.

Threaded into the socket (14) I have shown the base (15) of an ordinary separable plug. The knife contacts of the plug cap (16) are electrically connected with the conductors within a cord (17) in the usual manner. The separable plug serves as a handy means for switching the heater (11) into and out of use. The cover (8) may, if desired, be provided with a small opening and a cover (18) therefor, in order that the inside of the heating vessel may be exposed to the outside air or the heating vessel filled without disturbing the lid or cover (8) and the heater carried thereby.

What I claim and desire to secure by Letters Patent of the United States is—

1. In combination, a rigid heating vessel provided with the usual opening at the top thereof, a lid or cover closing said opening, an inclosed electric heater for said vessel, spacing rods rigidly securing said heater to said lid or cover, electrical conductors passing through said spacing rods and being connected to said heater, said entire heater being disposed in close proximity to the bottom of said vessel when said lid or cover is in position, and removable from the vessel with the lid or cover, and a handle having circuit terminals therein, said handle being secured to said cover, substantially as described.

2. In combination, a rigid heating vessel having a thin metallic heat conducting bottom provided with the usual opening at the top thereof, a lid or cover conformed and adapted to close said opening, an inclosed electric heater of spiral conformation secured to and spaced from said lid or cover, and insulated electric conductors inclosed in said securing and supporting means, said heater having each convolution of said spiral disposed in close proximity and presented edgewise to the bottom of said vessel when the lid or cover is in position, and removable from the vessel with said lid or cover, substantially as described.

3. In combination, a heating vessel provided with the usual opening at the top thereof, a lid or cover conformed and adapted to close said opening, tubes secured to said top, an electric heater of spiral conformation secured to and spaced from said lid or cover by means of said tubes, said heater being disposed in close proximity to the bottom of said vessel when the lid or cover is in position and removable from the vessel with said lid or cover, a handle for said cover, a socket in said handle and conductors located in said tubes electrically connecting said heater with said socket, substantially as described.

4. In combination, a rigid heating vessel provided with the usual opening at the top thereof a lid or cover conformed and adapted to close said opening, an inclosed electric heater spaced and suspended from said lid or cover, and adapted to be completely submerged in the liquid in said vessel, means for connecting said heater with a source of electric energy, said heater being removable from said vessel with said lid or cover, said lid or cover having an opening whereby the interior of said vessel may have communication with the outside air when desired without disturbing said lid or cover and the heater attached thereto, and a closure for said opening, substantially as described.

5. In combination, a closed heating vessel having a readily removable top portion, a handle connected to said top, said handle bearing a socket for the ready attachment of electric conductors, an inclosed and insulated electric heater element rigidly connected to said top and held in proximity to the bottom of said vessel, and lead wires insulated from each other and from the heating vessel connected to said heating element and to the socket in said handle whereby said heater, top, and handle form a single unitary structure.

6. In a heater for liquids, a vessel having an open top, a combination for a resistor formed into a flat spiral body, said resistor having its edges disposed in a vertical direction to offer a minimum resistance to the circulation of the liquid, said resistor being inclosed in a metallic sheath metal tubes joining said sheath, lead-wires connecting said resistor disposed in said tubes and means joining the tops of said tubes, said means forming a support for said heater and a closure for the top of said vessel, said heater being suspended by said support at the bottom of said vessel in a liquid to heat the same.

7. In combination a tea kettle having an open top, a lid for the same, a handle secured to said lid, circuit terminals in said handle, a pair of hollow rods secured to the bottom of said lid, a flat resistance heater formed into a spiral having the edges presented to the bottom of the kettle, a sheath for said resistance heater, said sheath being joined to the hollow rods to constitute a continuous sheath or armor and conductors connecting said resistance and said terminals, said conductors passing through said hollow rods.

In witness whereof, I hereunto subscribe my name this 8 day of April, A. D., 1913.

WILLIAM L. WATERS.

Witnesses:
FRANK A. WARD,
WALTER D. YOUNG.